United States Patent [19]
Oswin et al.

[11] 3,909,386
[45] Sept. 30, 1975

[54] GAS DETECTOR UNIT

[75] Inventors: Harry G. Oswin, Chauncey; Howard W. Bay, Long Island, both of N.Y.

[73] Assignee: Energetics Science, Inc., Elmsford, N.Y.

[22] Filed: Sept. 11, 1972

[21] Appl. No.: 287,806

Related U.S. Application Data

[63] Continuation-in-part of Ser. No. 88,267, Nov. 10, 1970, Pat. No. 3,776,832, and a continuation-in-part of Ser. No. 172,486, Aug. 17, 1971, Pat. No. 3,824,167, and a continuation-in-part of Ser. No. 263,531, June 16, 1972, Pat. No. 3,824,168.

[52] U.S. Cl. ............... 204/195 R; 204/1 T; 323/68
[51] Int. Cl.² ......................................... G01N 27/46
[58] Field of Search............ 204/1 T, 195 R, 195 P; 323/68

[56] References Cited
UNITED STATES PATENTS

| | | | |
|---|---|---|---|
| 3,208,926 | 9/1965 | Eckfeldt | 204/195 R |
| 3,234,117 | 2/1966 | Rost et al. | 204/195 R |
| 3,432,418 | 3/1969 | Kleiss | 204/195 P |
| 3,450,620 | 6/1969 | Brewer | 204/195 R |
| 3,470,071 | 9/1969 | Vertes et al. | 204/1 T |
| 3,528,904 | 9/1970 | Cliffgard | 204/195 P |
| 3,663,409 | 5/1972 | Greene | 204/195 P |
| 3,685,346 | 8/1972 | Molloy | 204/195 P |
| 3,776,832 | 12/1973 | Oswin et al. | 204/195 R |

*Primary Examiner*—T. Tung
*Attorney, Agent, or Firm*—Larson, Taylor and Hinds

[57] ABSTRACT

An electrochemical device for detecting and quantitatively measuring a select gas in a gaseous medium which includes an electrochemical cell comprising a working electrode, a counterelectrode, and an electrolyte which is independent of, or unaffected by temperature and humidity changes is described. The device incorporates temperature-compensating circuitry comprising thermistors which automatically and simultaneously adjusts for both the zero (signal output when the gas being detected is not present) and span (signal output when the gas being detected is present) changes as a result of variation in temperature. The described device compensates for humidity change through use of a relatively large, predetermined electrolyte volume in contact with the working electrode of the cell. The device provides accurate readings under all temperature and humidity conditions.

5 Claims, 10 Drawing Figures

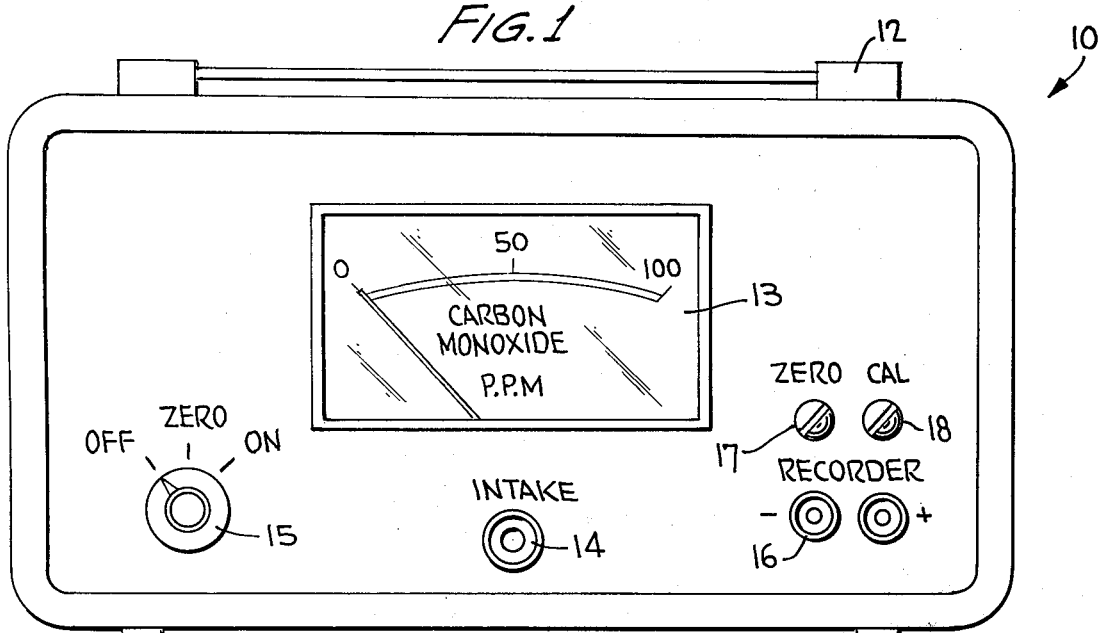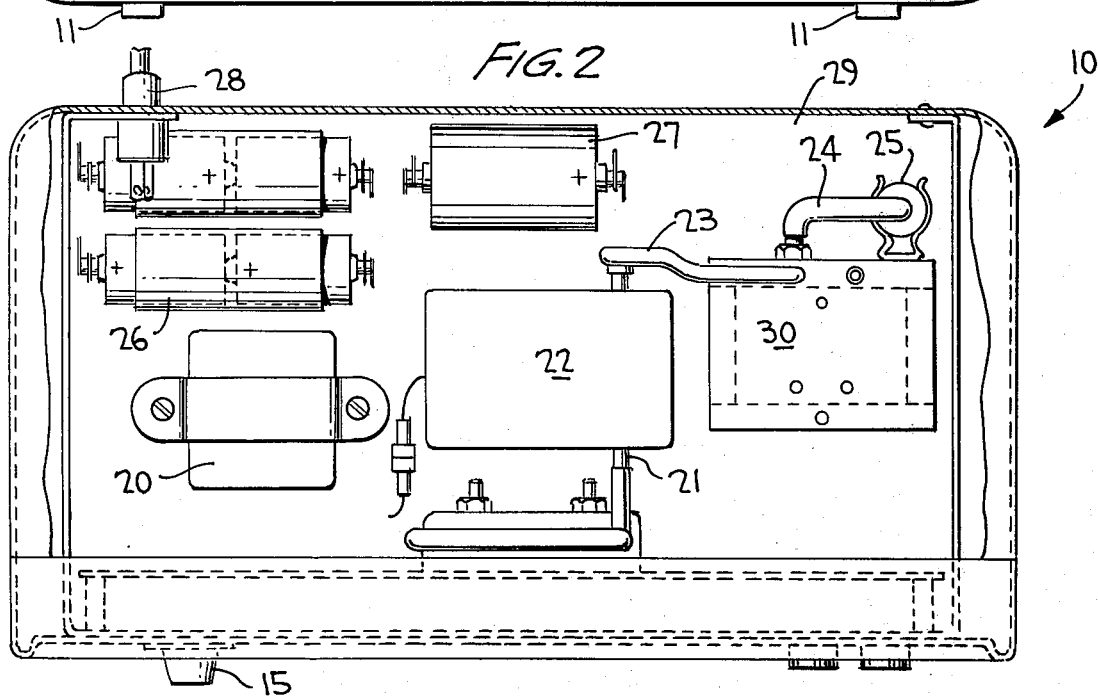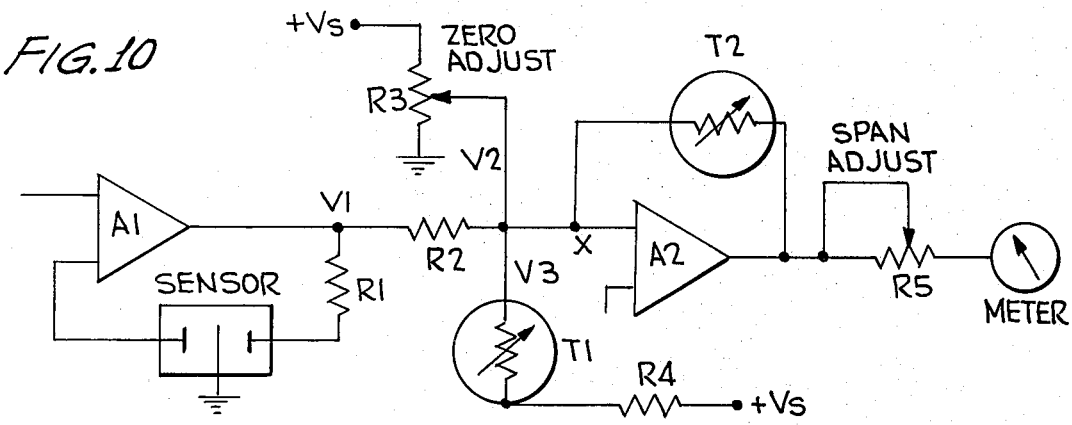

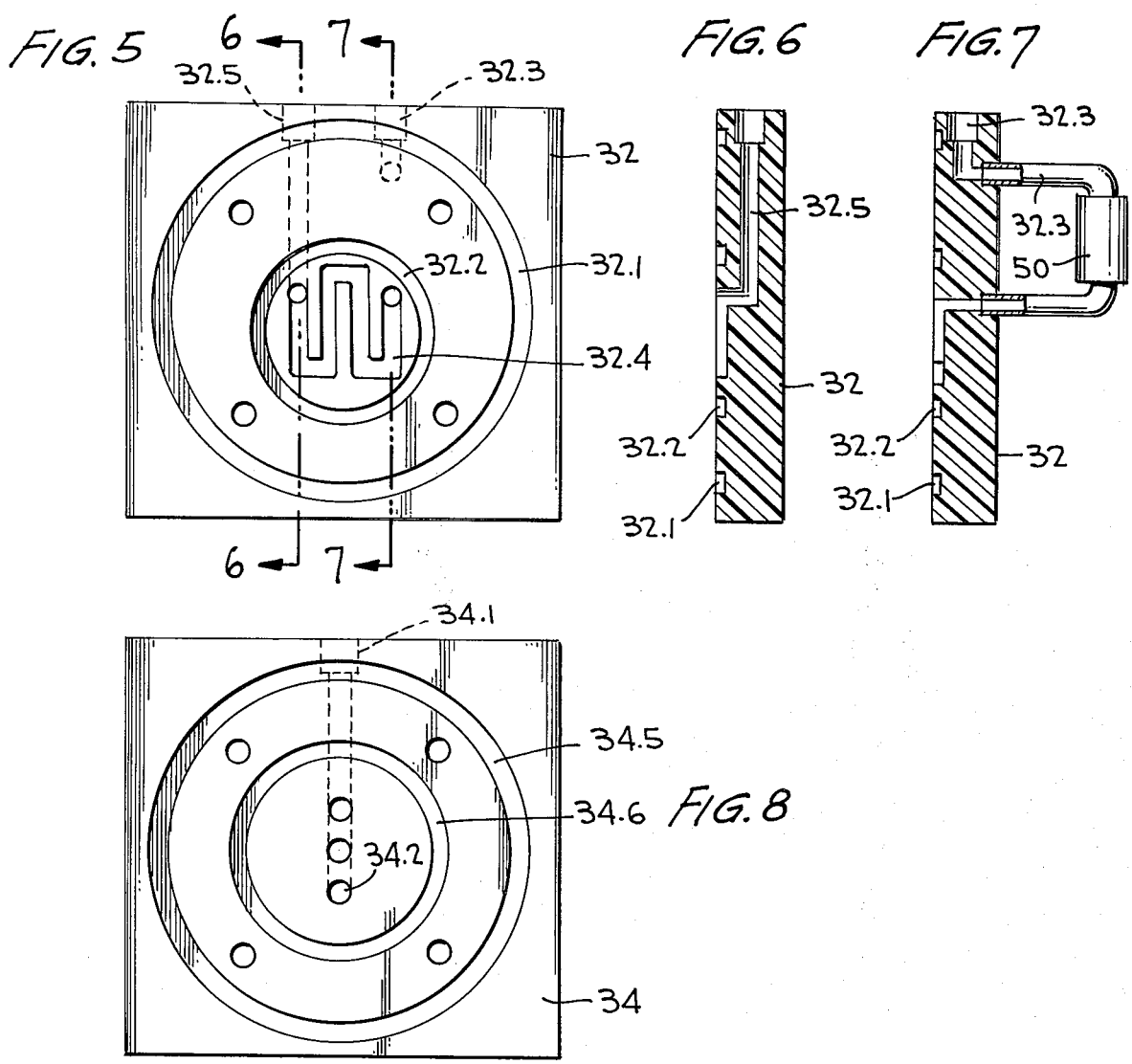
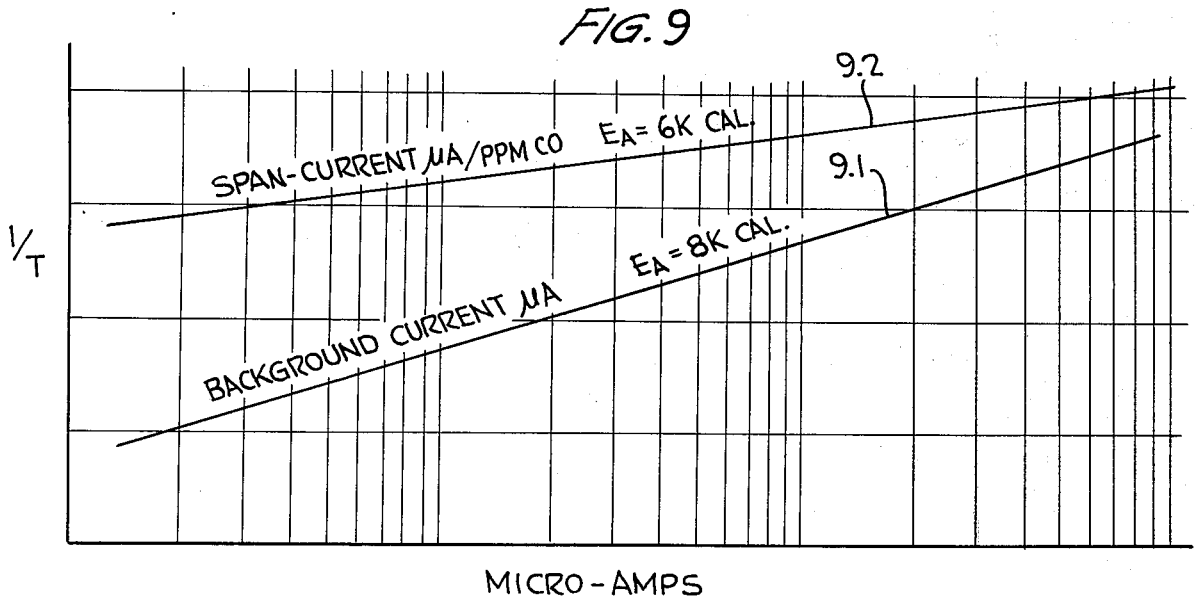

GAS DETECTOR UNIT

This application is a continuation-in-part of Oswin and Blurton applications U.S. Ser. Nos. 88,267 filed Nov. 10, 1970, now U.S. Pat. No. 3,776,832; 172,486 filed Aug. 17, 1971, now U.S. Pat. No. 3,824,167, and 263,531 filed June 16, 1972, now U.S. Pat. No. 3,824,168.

FIELD OF INVENTION AND BACKGROUND

This invention relates to an improved device for detecting and quantitatively measuring a select gas in a gaseous medium. More particularly, the invention relates to a device which is compact, dependable, easy to operate, rapid, and relatively inexpensive for detecting and quantitatively measuring a gas such as carbon monoxide, hydrocarbons, or an alcohol in an environment which is independent, or substantially independent, of changes in temperature and humidity. The device includes intake means for the gaseous sample, an electrochemical cell comprising a working electrode, a counterelectrode, and a large volume of electrolyte in contact with said electrodes for detecting and quantitatively measuring the gas; means for drawing the gas sample being analyzed into the electrochemical cell through the intake, and electronic temperature compensating circuitry including thermistors which automatically and simultaneously adjust for both the zero (signal output when the gas to be detected is not present) and span (signal output when gas to be detected is present) changes.

The device as a result of the large volume of electrolyte in contact with the working electrode is unaffected by variations in the humidity in the environment in which the device is employed, and as a result of the temperature-compensating circuitry permits the use of the cell over wide temperature ranges without error due to variation in temperature. Although the invention is not limited thereto, for convenience it will be described primarily with reference to a device for detecting and meeasuring the CO content in the atmosphere. As will be apparent, however, the device can be used as it is or with slight modification or adaptation for detecting and measuring other gases including hydrocarbons, the alcoholic content in the breath of a test subject, or gases capable of being converted into alcohols, carbon monoxide, or hydrocarbons, or other gases which can be electrochemically consumed where similar conditions apply.

In the aforesaid U.S. Ser. No. 172,486 and U.S. Ser. No. 263,531, a gas detecting unit is described capable of detecting and quantitatively measuring carbon monixide, alcohol, or the like in a gas sample which comprises in combination as essential elements intake means, an electrochemical cell, means for drawing a gas through the intake means and into the electrochemical cell at a controlled flow rate and readout means for reading the quantity of detected gas as well as various modifications to the aforesaid unit. The electrochemical cell disclosed in the aforesaid applications comprises an anode which provides a catalytic site for electrochemical reaction of the gas being detected, i.e., carbon monoxide, an alcohol, etc.; a cathode or counterelectrode, a reference electrode, and an electrolyte in contact with the anode, cathode, and reference electrode, The anode of the cell is maintained at a fixed potential relative to the potential of the reference electrode which is substantially free of current flow to ensure that the current production is a result of the gas being detected and not other gases including oxygen. The fixed potential is selected within the range of from about 0.7 to 1.5 volts in order that only the gas being detected is electrochemically reacted, precluding the possibility that other gases in the sample as well as an oxygen/water redox couple will influence the current produced. The means for drawing the gas through the intake means into the cell will effectively pass a predetermined quantity of gas to a predetermined anode surface area, thereby assuring the continuous accuracy in the quantitative measurement. Preferably, the quantity of gas fed to the anode surface is controlled by a constant flow control means which feeds the gas sample to the electrochemical cell at a constant rate, with the balance of the gas sample being vented off. Pumping or suction means are normally employed to draw the gas sample through the intake means, the electrochemical cell, and flow control means in metered amounts.

In accordance with the aforesaid applications, it is indicated that the detecting devices therein can be operated over various temperatures and humidities by making suitable adjustments to the devices in order that the sample is always present at a relatively constant temperature and/or humidity. Although such devices are highly satisfactory, improvements therein have now been discovered permitting more accurate readings over wide variations in temperature and humidity conditions without need of means for maintaining the cell at a constant temperature and relative humidity.

OBJECTS AND GENERAL DESCRIPTION OF THE INVENTION

Accordingly, a primary object of the present invention is to provide a compact, inexpensive, and easy-to-operate device for accurately and reproducibly detecting and quantitatively determining the level of a given gas in a specific environment which is substantially independent of temperature.

Another object of the present invention is to provide a compact, inexpensive, and easy-to-operate device for accurately and reproducibly detecting and quantitatively measuring the level of a given gas in a specific environment which is substantially independent of humidity.

It is another object of this invention to provide a compact, inexpensive, and easy-to-operate electrochemical device for accurately and reproducibly detecting and quantitatively determining the level of a given gas in a speciic environment without possible fluctuation in the readout as a result of possible temperature change which utilizes electronic circuitry comprising thermistors which automatically and simultaneously adjust for both zero and span changes as a result of a temperature change.

It is another object of this invention to provide a compact, inexpensive, and easy-to-operate electrochemical device for accurately and reproducibly detecting and quantitatively determining the level of a given gas in a specific environment without possible fluctuation in the readout as a result of possible change in humidity which employs a cell utilizing a large electrolyte volume.

It is another object of this invention to provide an electrochemical cell wherein the volume of electrolyte in contact with a working electrode can be increased without increasing the space between the working electrode and a counterelectrode.

It is another object of this invention to provide an electronic circuit which will permit the simultaneous control of two diverse functions which change logarithmically as a result of a temperature change.

These and other objects of the present invention will be more readily apparent from the following detailed description with particular emphasis being directed to the drawings and preferred embodiments.

The objects of the present invention are accomplished by modifying the detecting unit of the type described in U.S. Ser. Nos. 172,486 and 263,531.

HUMIDITY

In conventional electrochemical cells employing non-consumable electrodes, the electrolyte volume is usually maintained at as low a level as possible in order that the distance between electrodes can be kept as narrow as possible, thereby keeping the internal resistance of the cell as low as possible. With such cells when operated on atmospheric air, whether the electrolyte is free-flowing, a paste, or retained in a matrix, a difficulty is encountered due to a change in water volume in the electrolyte as a result of a change in moisture content of the air passed to the cell. If the air is extremely dry, water will be removed or lost from the cell electrolyte; whereas, if the air is very moist, water will be taken up by the electrolyte. Either occurrence results in a change in the electrical output of the cell.

It has now been found that in a detector unit of the type defined herein the effect of a variation of the moisture in air or a change in humidity can be completely or substantially completely eliminated over a period of time by increasing the volume of the electrolyte in the sensor cell with respect to the surface area of the working electrode. Thus, an increase in the volume of the electrolyte in relation to the working surface area of the electrode eliminates or minimizes the change in cell performance as a result of water loss or water addition to the electrolyte. The ratio of electrolyte volume to electrode surface area to effect the desired results will vary depending upon the time period during which a stable unit, without calibration, is desired or essential. If the stability is only critical over a period of about 24 hours, i.e., the detecting unit can be conveniently calibrated after each 24-hours of use; the ratio of electrolyte in milliliters per square centimeter of working electrode surface area can be as low as 1:1 for a cell operated at 75°F. at 90 percent relative humidity, or at 75°F. at 10 percent relative humidity. On the other hand, if the cell must be stable over a period of 1 month or longer, at 75°F. and 100 percent relative humidity the ratio should be at least 10 milliliters electrolyte per square centimeter of working electrode surface area. The optimum ratio can be established empirically for given conditions. Normally, however, the ratio will be from about 1:15 milliliters electrolyte per square centimeter of electrode working surface area.

Surprisingly, the increase in internal resistance of the cell as a result of the increased electrolyte volume in a detector unit of the type defined herein is not significant. Moreover, in the event the IR increase is noticeable, an even greater electrolyte volume to electrode surface area, without detriment as a result of increased internal resistance, can be accomplished by constructing the cell in order that the reservoir of electrolyte is increased without increasing the distance between the working electrode and a counterelectrode. This can be done by having an electrolyte chamber larger in cross-section than the cross-section of the working electrode, or an electrolyte pool which is in communication with the working electrode can be utilized. These expediencies permit a large electrolyte volume without a corresponding increase of the spacing between electrodes.

Accordingly, a cell which is completely or substantially completely independent of humidity change can be provided by increasing the electrolyte volume of the cell per unit of electrode surface area.

TEMPERATURE

Detector units of the type defined herein, like other electrochemical cells, are sensitive to temperature. Both zero (signal output when the gas being detected is not present) and span (signal output when the gas being detected is present) are directly proportional to temperature; that is to say, as temperature increases, both zero and span increase. This variation with temperature, however, is not linear but logarithmic. As a result, as seen from U.S. Ser. Nos. 172,486 and 263,531, a solution to the problem of opeating the detector unit at varying temperatures is to maintain the sensor cell at a uniform, or substantially uniform, tempeature by use of heat reservoirs in the cell, or the like.

It has now been found that it is possible to compensate for both zero and span changes due to temperature variation through the utilization of electronic circuitry comprising thermistors. Thermistors vary in response to a change in temperature logarithmically, but in the opposite direction to the change in an electrochemical cell as a result of span and zero. Thus, the thermistor functions as a thermally sensitive resistor whose resistance varies inversely with temperature; or, stated in another way, thermistors have a large negative temperature coefficient, that is, as the temperature rises resistance of the thermistor decreases and as the temperature drops the resistance increases.

As a result of the aforesaid, it is possible to sense the temperature of the electrochemical device by utilizing a thermistor tied into suitable electronic circuitry, and continuously and automatically adjust for both the zero and span changes in the electrochemical sensor unit. It is necessary, however, since the zero and span do not change at a continuous and uniform rate to utilize two separate sensing thermistors which are to a substantial extent dependent upon one another. Thus, to control the separate functions of background current or zero current and span current, two different thermistors tied into separate but interconnected circuits are essential.

Accordingly, an electrochemical detector unit which is insensitive or independent of both temperature and humidity change is constructed in accordance with the present invention by utilizing a detector cell having a large electrolyte volume per surface area of electrode; and in conjunction with said cell, utilizing electronic circuitry comprising thermistors which will automatically adjust for or compensate for any variation in both span and zero.

THE DRAWING

The detecting device of the present invention will be more readily apparent from the accompanying drawings wherein like numerals are employed to designate like parts. In the drawing —

FIG. 1 is a front view of the electrochemical unit;

FIG. 2 is a diagrammatic view, cut-away at the top showing the layout of the various components or elements of the unit of FIG. 1;

FIG. 5 is a detailed view of one end plate of the sensor of FIG. 3;

FIG. 6 is a cross-sectional view taken along lines 6—6 of FIG. 5;

FIG. 7 is a cross-sectional view taken along lines 7—7 of FIG. 5;

FIG. 8 is a detailed view of the face of the second end plate of the sensor of FIG. 3;

FIG. 9 is a graph showing the slope of the zero and span line of a typical sensor cell; and FIG. 10 is a circuit diagram for the temperature compensating means of the unit of FIG. 1.

Figure 3:
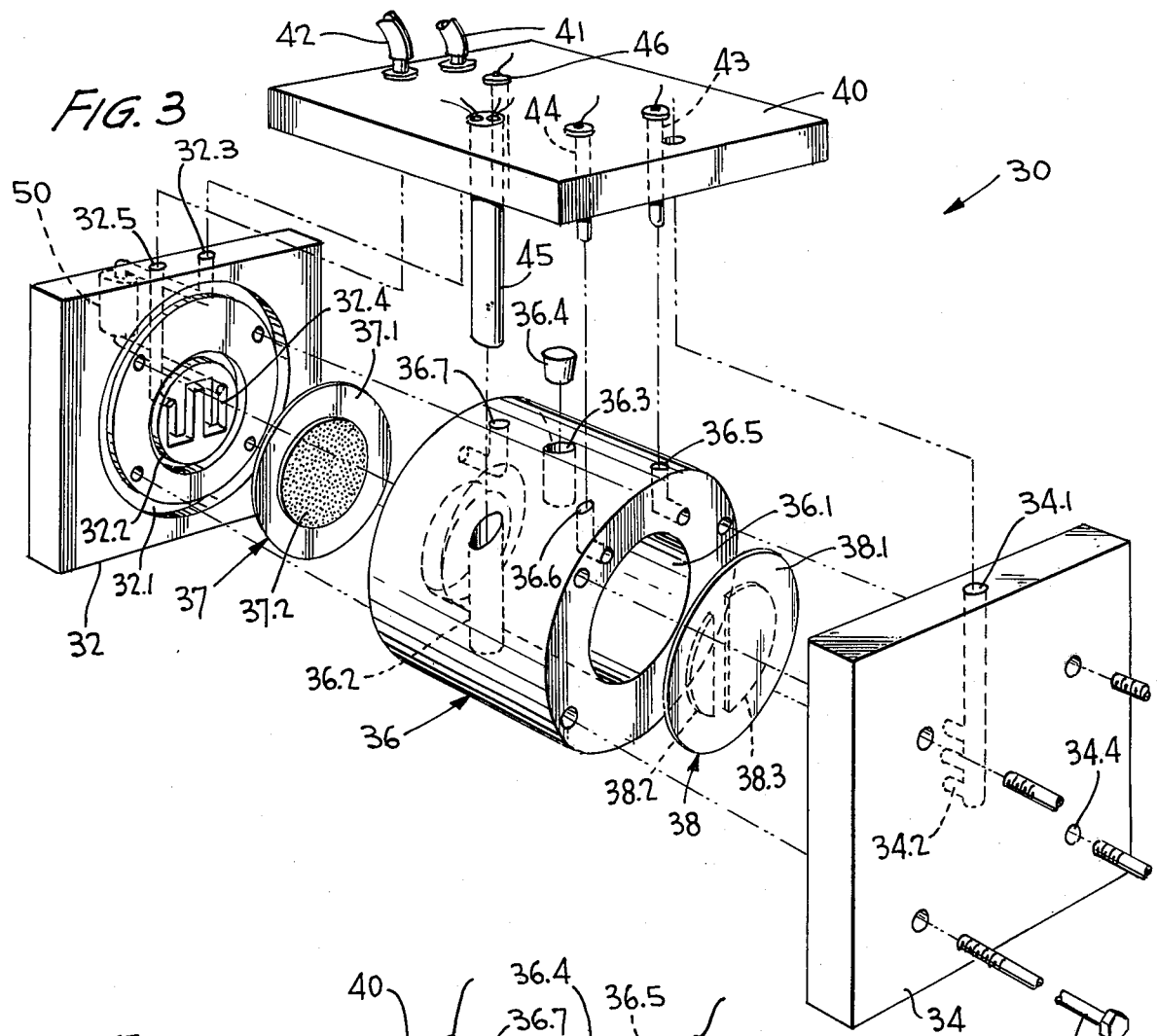
FIG. 3 is an exploded perspective view of the electrochemical sensor utilized in the unit of FIG. 1 showing part of the detail in phantom lines.

Referring to FIGS. 1 and 2, it is seen that the device comprises sample intake means 14 which is in communication with electrochemical sensor cell 30 through suitable conduit means 21 and 23 and pump 22. The device includes battery pack 26 for powering the electrochemical sensor unit 30, and a single battery 27 for powering pump 22. In actuating the device, the unit is turned from the off position to zero with knob 15. In the zero position, the unit is fully activated except that the pump is not on. In this position, the indicator line of meter or gauge 13 is set to the zero position by zero calibrating means 17 which, like calibrating unit 18, is a simple screwdriver adjusting means. After the unit is zeroed, the device is turned to the on position which actuates pump 22 for drawing a gas sample through intake means 14, through pump 22 to electrochemical sensor unit 30. After passing into the end plate of electrochemical sensor unit 30, the sample is passed out through the back of the end plate and through conduit 24 to filter unit 50 and to the working electrode of sensor 30. Periodically, but not more than once a day, the unit can be calibrated by feeding a known sample to the device through intake means 14. For example, a gas sample containing 50 parts per million carbon monoxide can be fed to the unit and the indicator needle of dial 13 can be adjusted to read 50 parts per million by adjusting calibration means 18. In order that the unit can be operated with batteries, i.e., as a fully portable unit, or by means of an AC current, transformer means 20 are also included. The electronic circuitry of the entire device is located below the base 29 of the device and, accordingly, is not seen. The electronics, with the exception of the temperature compensating means, which will be described more fully hereinafter, is substantially the same as the circuitry shown in co-pending application Ser. No. 263,531.

In order to compensate for changes in humidity, the electrochemical sensor cell 30, as most clearly shown in FIGS. 3 – 8, is constructed to have a large electrolyte volume. Thus, sensor 30 comprises end plates 32 and 34, electrode members 37 and 38, and housing 36 which will accommodate a large volume of electrolyte. The elements are held in operable association by bolts 39 which pass through holes, as exemplified by 34.4 in members 32, 34, and 36. Prior to assembly, however, electrodes 37 and 38 are peferably sealed to end plates 32 and 34 by suitable means such as a heat seal or ultrasonic weld or by a suitable adhesive.

A unique feature of the cell is that housing 36 can retain a large volume of electrolyte in contact with working electrode 37 without greatly increasing the distance between electrodes 37 and 38, since the diameter of the opening in housing 36 in contact with electrode 37 is smaller than the diameter of the electrolyte chamber. Note the non-concentric openings shown in phantom lines at FIG. 3, and in FIG. 4. Thus, the supply of electrolyte in contact with an electrode can be increased without increasing the distance and, therefore, the internal resistance or IR across the electrodes. As seen from the drawing, in addition to the heat seal or the like of the electrodes to the cell housing or end plates, a redundant sealing is provided by O-rings in channels 32.1 and 32.2, and in 34.5 and 34.6. Thus, effectively the sensor cell has three seals, the first O-ring, the heat seal of the electrode to the sensor housing or end plate, and the second O-ring. This provides a substantially failsafe sealing technique.

As seen from FIGS. 3 and 5 of the drawing, the gas flow behind working electrode 37 comprises a labyrinthical path. The gas being sensed is passed through opening 32.3 in end plate 32, to filter 50 positioned behind the end plate, and then to labyrinthical path 32.4 and vented through opening 32.5 in end plate 32. In the peferred detecting unit, working electrode or anode 37 comprises a polytetrafluoroethylene substrate 37.1 having a coating of platinum and polytetrafluoroethylene (PTFE) particles applied as a suitable pattern 37.2. Electrode 38, again in accordance with the preferred embodiment, comprises polytetrafluoroethylene substrate 38.1 having a coating of platinum and polytetrafluoroethylene (PTFE) particles applied as a suitable pattern. In the embodiment shown, the sensor cell has, in addition to a counterelectrode 38.3 which is fed with oxygen through openings 34.1 and 34.2 in end plate 34, a reference electrode 38.2. Thus, this sensor cell is of the type defined in co-pending application Ser. Nos. 172,486 and 88,267. Accordingly, the substrate 38.1 has two isolated and distinct electrode patterns 38.2 and 38.3; 38.3 being the counterelectrode and 38.2 being the reference electrode. As seen from FIG. 8, the oxygen is fed to electrode 38.3 through a plurality of openings to provide increased efficiency.

Figure 4:
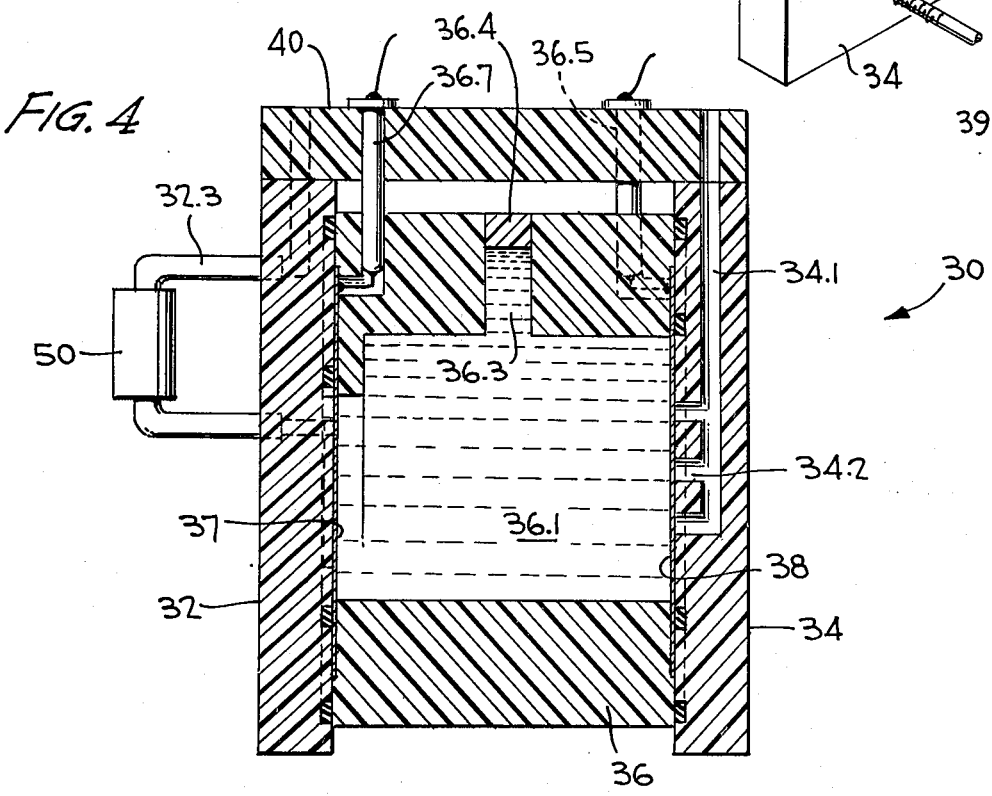
FIG. 4 is a cross-sectional view of the assembled sensor of FIG. 3.

As further seen from FIGS. 3 and 4, electrode faces 37.2, 38.2, and 38.3 are in electrical contact with leads or jacks 43, 44, and 46 in block 40 which forms the top of the cell herein through openings 36.5, 36.6, and 36.7. Additionally, gas inlet 32.3 and outlet 32.5 are in communication with conduits 41 and 42 on cover or top unit 40 which is mated to the electrochemical sensor. Unit 40 also includes an opening 45 which is mated to opening 36.2 in housing 36 which will house a pair of thermistors for sensing the temperature of the cell. As a result of the mated units, sensor cell 30 can be conveniently removed from the electrochemical detecting unit 10 merely by pulling up board 40 and withdrawing cell unit 30. A new cell unit can be inserted, board 40 re-engaged, and the unit is ready to operate. In addition to openings in housing 36 for receiving the thermistor and electrode contacts, housing 36 has electrolyte receiving opening 36.3. After the electrolyte is added to the cell, the opening is sealed with plug 36.4.

In view of the large electrolyte volume, the sensor cell and, accordingly, the electrochemical detector unit is not influenced by changes in humidity for substantial periods of time. The electrolyte volume can be adjusted in relation to the working area of the electrode so that the cell can operate at 10 to 100 percent relative humidity for from 24 hours to several months without need for calibration. As will be apparent to one skilled in the art, in view of the discussion hereinbefore, the cell can be modified to meet most any set of conditions. For practicality, the lower ratio of electrolyte volume to electrode surface area is about 1 milliliter of electrolyte per square centimeter of working electrode surface area; however, the upper end of the range can be substantially increased, for example up to 60 milliliters of electrolyte per square centimeter of electrode and higher.

The detector unit can be constructed to be free or substantially free of variation due to temperature change by utilizing a relatively simple electronic circuit even though span current and background current are logarithmic functions rather than linear functions; and even though they do not change uniformly as temperature increases or decreases. Thus, referring to FIG. 9, it is seen that the background current or zero current varies logarithmically on a line having the slope 9.1, whereas the span current while again varying logarithmically changes at a different rate to give curve 9.2. By utilizing the circuitry as shown in FIG. 10 which relies on thermistors $T_1$ and $T_2$ which sense the temperature of the cell as a result of ports 36.2/45, it is possible to provide a cell which will automatically compensate for any temperature change without variation in the cell reading. Referring to FIG. 10, when no gas which is being detected (hereinafter referred to as carbon monoxide) is present, the sensor output provides a negative voltage $V_1$ signal across resistor $R_1$. This is the background signal or zero signal of the sensor. In order that the output of amplifier $A_2$ is zero, the input to $A_2$ must be zero. This means that the negative voltage $V_1$ developed across $R_1$ must be counterbalanced by a positive voltage at point X. This is done by a combination of the zero adjust $R_3$ and the thermistor $T_1$. Once $R_3$ is set, its voltage contribution $V_2$ to point X is fixed. At a given temperature, for example, 70°F. or room temperature; the voltage developed across thermistors $T_1$ is also fixed. $R_3$ is adjusted such that the combination of voltages $V_2$ and $V_3$ counterbalance the voltage $V_1$. However, if the temperature increases, the sensor signal $V_1$ will become more negative causing an imbalance at point X. The thermistor resistor at $T_1$ now also varies with temperature in order that the positive voltage contribution $V_3$ increases, offsetting the increase in $V_1$ and returning point X to zero voltage. Should the temperature decrease, the reverse or converse process will occur and point X will again return to zero voltage. The resistor $R_4$ is chosen so that only a small current will flow through $T_1$, thus avoiding self-heating of the thermistor due to internal heat dissipation.

It is noted and it is to be understood that not any value thermistor will adjust the zero. Its value must be chosen to that its contribution to $V_3$ counterbalances the change in signal $V_1$. This is first done by measuring the change in $V_1$ with temperature, choosing a value of $T_1$ from the literature, and then refining the circuit empirically. It is essential that the thermistors have a larger temperature coefficient (or activation energy) than the function being compensated.

The theory of operation is believed to be as follows: Point X must be at zero volts if the meter is to give an accurate reading of the CO level. Should point X not be zero, then the span value will be added to a non-zero starting point and the meter will not reflect the true CO level. When CO is introduced into the sensor, a negative signal proportional to the carbon monoxide concentration is developed across $R_1$. This signal causes an imbalance at point X and the resultant output voltage from amplifier $A_2$ drives the meter upscale. Span adjust $R_5$ varies the signal to the meter, thereby enabling the span to be set at the desired level. The signal developed at point X is amplified by $A_2$. The amplification factor is determined by the resistance of thermistor to $T_2$ divided by $R_2$. As the temperature increases, the signal at point X goes more negative for a given CO level. To compensate for this, the amplification factor decreases a corresponding amount and the output remains temperature invariant. The amplification factor being $R_T/R_2$ is decreased by a decrease in $R_T$. This is compensated for by the thermistor where resistance decreases with increasing temperature. In the circuit of FIG. 10, although the thermistors $T_1$ and $T_2$ do not mutually interact, there is a relationship between zero and span. Should the zero be at any value other than zero, the effect will be to offset the span reading by whatever amount the zero is off true zero. In the detector unit of the present invention, the temperature sensed by thermistors $T_1$ and $T_2$ must be that of the sensor. To ensure this, the cell is preferably constructed of materials having low thermal conductivity and high specific heat such as plexiglass, polypropylene, or other polymeric materials. Further, the thermistors, as seen from FIG. 3, are embedded in the cell itself. This makes certain that temperature changes in the sensor will occur at a slow rate and that the thermistors being embedded in the sensor will respond to sensor temperature only.

Although the values of the different resistors and thermistors in the electrochemical unit are, in a sense, determined empirically for a detector unit capable of measuring 0.5 – 100 parts per million carbon monoxide in the atmosphere, resistances will be as follows: $R_1$ = 1500 ohms; $R_2$ = 5100 ohms; $R_3$ = 10,000 ohms; $R_4$ = 180,000 ohms; $R_5$ = 5,000 ohms; $V_1$ = 20 mV; $V_2$ = 15 mV; $V_3$ = 25 mV; and the thermistor $T_1$ will have a value of 3,000 ohms, and $T_2$ a value of 10,000 ohms. The amplifiers, $A_1$ and $A_2$, are high input impedency amplifiers which must operate at plus or minus 2 volts. Suitable amplifiers are sold by the Fairchild Corporation as Model No. 776.

It will be apparent to one skilled in the art that various modifications can be made in the invention herein defined. Thus, although the description and drawing illustrate a free-flowing aqueous electrolyte, it is possible to employ pastelike electrolytes, electrolytes retained in matrices, or the like. Further, as will be apparent, the electrolyte can be any aqueous fluid material which is ionically conductive, including phosphoric acid, sulfuric acid, the alkali and alkaline hydroxides such as potassium hydroxide, potassium carbonate, and the like. Moreover, although the sensor cell of the detecting unit utilizes three electrodes in the illustrated and preferred embodiment, i.e., a working electrode, a counterelectrode, and a reference electrode; the concept of the present invention can apply as well to detecting units utilizing sensing cells with only a working and counterelectrode. Furthermore, the fluid flow to the electrochemical sensor of the detecting unit can be varied over substantially large ratios. However, preferably the fluid flow to the sensor cell will be relatively high. In view of the large volume of electrolyte, a high fluid flow is not detrimental in that the electrolyte is substantially immune to changes in cell performance as a result of the passage of humid or dry air to the cell. Additionally, while the invention has been defined utilizing polytetrafluoroethylene substrate electrodes, other lightweight electrodes commonly employed in the electrochemical arts can be employed. The aforesaid modifications being within the ability of one skilled in the art, particularly in light of the disclosure contained in the applications referred to hereinbefore, are to be covered by the appended claims.

It is claimed:

1. A gas detecting and measuring unit for detecting and quantitatively measuring a gas in a gaseous medium comprising in combination intake means, an electrochemical cell, means for drawing a gas through said intake means and into said electrochemical cell at a controlled flow rate, readout means for reading the quantity of said detected gas, and an electronic circuit comprising two thermistors; both said thermistors being arranged with said cell to sense the temperature of said cell; one thermistor compensating change in background current with temperature and the other compensating change in span with temperature; said circuit automatically adjusting for background and span for any change in temperature sensed by said thermistors, whereby said cell provides a substantially constant signal for a given volume of sample at varying temperatures.

2. The gas detecting and measuring unit of claim 1 wherein said cell comprises a working electrode, a counterelectrode, and an electrolyte in contact with said working electrode and said counterelectrode; the electrolyte volume being sufficiently large in relation to the surface area of said working electrode to substantially nullify, the effect of any change in electrolyte volume due to a change in humidity, whereby said cell provides a substantially constant signal for a given volume of sample at varying temperatures and humidities.

3. The gas detecting and measuring unit of claim 2 wherein the electrolyte of said cell is contained in an electrolyte chamber, said chamber having a larger cross-section than the cross-section of said working electrode.

4. The gas detecting and measuring unit of claim 1 wherein said electrochemical cell comprises a housing, an anode, a cathode, and an electrolyte between said anode and said cathode, said housing comprising a first end plate, a second end plate, and a central section, said central section forming an electrolyte chamber for said electrolyte, said electrolyte chamber having a greater cross-sectional area than the cross-sectional area of at least one of said anode and cathode, said anode and cathode being sealed to one of said central sections or end plates; said cell being tied together by suitable means, and having first and second O-rings providing redundant seals, said first O-ring being inward of said first-mentioned seal and said second O-ring being external of said first-mentioned seal.

5. The gas detecting and measuring unit of claim 4 wherein the electrodes comprise a hydrophobic polymer substrate and a catalytic layer on a section of said substrate to form the active electrode working surfaces, said substrate being sealed to said central section or end plates, and said O-rings being outward of said catalytic area.

* * * * *